(12) United States Patent
Shimizu

(10) Patent No.: US 9,482,280 B2
(45) Date of Patent: Nov. 1, 2016

(54) ROLLER BEARING CAGE

(71) Applicant: NTN CORPORATION, Osaka (JP)

(72) Inventor: Yasuhiro Shimizu, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/771,605

(22) PCT Filed: Mar. 5, 2014

(86) PCT No.: PCT/JP2014/055561
§ 371 (c)(1),
(2) Date: Aug. 31, 2015

(87) PCT Pub. No.: WO2014/136816
PCT Pub. Date: Sep. 12, 2014

(65) Prior Publication Data
US 2016/0010690 A1    Jan. 14, 2016

(30) Foreign Application Priority Data

Mar. 8, 2013    (JP) .................................. 2013-046615

(51) Int. Cl.
*F16C 19/36* (2006.01)
*F16C 33/50* (2006.01)
*F16C 43/04* (2006.01)

(52) U.S. Cl.
CPC .......... *F16C 33/502* (2013.01); *F16C 19/361* (2013.01); *F16C 43/04* (2013.01); *F16C 19/364* (2013.01)

(58) Field of Classification Search
CPC  F16C 33/3812; F16C 33/502; F16C 33/504; F16C 33/508; F16C 33/4611; F16C 19/361; F16C 43/04
See application file for complete search history.

(56) References Cited

U.S. PATENT DOCUMENTS

2009/0208161 A1* 8/2009 Jauernig ................. F16C 19/34
                                                       384/572
2012/0263408 A1   10/2012 Yamada et al.

FOREIGN PATENT DOCUMENTS

DE           2602265 A1 *   7/1976   .............. F16C 29/04
DE     102008011112 A1 *   8/2009   .......... F16C 33/4611

(Continued)

OTHER PUBLICATIONS

International Search Report issued Jun. 3, 2014 in corresponding International Application No. PCT/JP2014/055561 (with English translation).

(Continued)

*Primary Examiner* — Alan B Waits
(74) *Attorney, Agent, or Firm* — Wenderoth, Lind & Ponack, L.L.P.

(57) ABSTRACT

A roller bearing retainer is constituted by two or a greater number of circumferentially disposed segments. Each segment includes: a plurality of columns provided between mutually opposing long sides of a rectangle; and a plurality of pockets for holding rollers between the columns. At least one of the mutually opposing long sides of the segment includes an arc-shaped connecting member having a generally U-shaped section for slidable fitting in a circumferential direction. The segments are arranged in the circumferential direction, and under this state, the connecting members of each segment is slid over the long side of the adjacent segment, whereby the segments are mutually connected with each other.

8 Claims, 9 Drawing Sheets

(56) References Cited

FOREIGN PATENT DOCUMENTS

| DE | 102012206023 A1 | * | 10/2013 | ......... F16C 33/4676 |
| GB | 825689 A | * | 12/1959 | ......... F16C 33/4611 |
| JP | 50-84733 | | 7/1975 | |
| JP | 2007-64437 | | 3/2007 | |
| JP | 2009-63102 | | 3/2009 | |
| JP | 2011-117545 | | 6/2011 | |
| JP | 2011-149549 | | 8/2011 | |
| JP | 2011-208700 | | 10/2011 | |
| JP | 2012-132535 | | 7/2012 | |

OTHER PUBLICATIONS

International Preliminary Report on Patentability issued Sep. 8, 2015 in International Application No. PCT/JP2014/055561 (with English Translation).

* cited by examiner

ROLLER BEARING CAGE

TECHNICAL FIELD

The present invention relates to a retainer for use in a large roller bearing, particularly in a tapered roller bearing which is utilized to support a main shaft in a wind power-generator, and also for use in a large tapered roller bearing which has an outer diameter in excess of one meter for example, used in industrial equipment.

BACKGROUND ART

A tapered roller bearing may include a retainer, a cage usually made from a steel plate. The retainer integrates an inner ring and rolling elements with each other. In an ultra-large tapered roller bearing which is often used as a main bearing in the field of wind power-generation, it is difficult to make a single-piece retainer from a steel plate.

As an alternative, therefore, there is proposed a welded retainer which includes support rods inserted through hollow rollers, and two side plates welded to the support rods. Another alternative is a segmented (divided) retainer which requires special fabrication method using dedicated jigs.

The first alternative has a problem of welding cost while the second alternative has a problem of handling difficulty. The second alternative, which was found to have some cost advantage, was improved further. As found in Patent Literature 1 and Patent Literature 2, in retainers used in large tapered roller bearings, an immobilizing member is arranged with a segmented retainer or a separated retainer on a circumference to prevent separation during assembly, for improved handling and assemblability. Also, Patent Literature 3 discloses an arrangement that a segmented retainer is immobilized by a ring member in order to prevent the segmented retainer from breaking apart during assembly.

CITATION LIST

Patent Literature

Patent Literature 1: JP-A 2009-63102 Gazette
Patent Literature 2: JP-A 2007-064437 Gazette
Patent Literature 3: JP-A 2011-149549 Gazette

SUMMARY OF INVENTION

Technical Problem

A problem, however, with the segmented retainer according to Patent Literature 1 and the separator retainer according to Patent Literature 2 is the ring members which are used to prevent separation. For ultra-large sizes, machining on the ring members requires a substantial cost and also is difficult. Another problem is that since the ring member is fixed to an inner ring, dimension control in fitting areas is difficult, and assembling of the ring members is also difficult.

The alternative disclosed in Patent Literature 3 raises a similar problem that it is difficult to make the ring member for ultra-large sizes.

It is therefore an object of the present invention to prevent separation of a segmented retainer at the time of assembly, without utilizing an ultra-large size ring member which is difficult to make.

Solution to Problem

As a solution to the problems described above, the present invention provides a roller bearing retainer constituted by two or a greater number of circumferentially disposed segments. Each segment includes: a plurality of columns between mutually opposing long sides of a rectangle; and a plurality of pockets for holding rollers between the columns. At least one of the mutually opposing long sides of the segment is fitted, in a circumferentially slidable fashion, into an arc-shaped connecting member which has a generally U-shaped section. The segments are arranged in the circumferential direction, and then the connecting member of each segment is slid over the long side of the adjacent segment for mutual connection of the segments.

By placing the segments on the outer circumference of the inner ring first, and then sliding the arc-shaped connecting member over the long side of the adjacent segment, the roller bearing retainer according to the present invention can be assembled to an outer circumference of an inner ring without breaking apart.

The arc-shaped connecting member may have a circumferential length equal to a length of the long side of the segment if not longer than that, or the long side of the segment may be divided into a plurality of portions. The arc-shaped connecting member which has the same circumferential length as the long side of the segment gives advantages of decreased number of parts and ease of handling.

Also, the segments which are assembled onto the outer circumference of the inner ring can be easily removed by sliding back so as not to ride on the adjacent segment. This makes it easy to perform inspections.

Advantageous Effects of Invention

According to the present invention it is possible to prevent separation of segments during assembly, without utilizing an ultra-large size ring member which is difficult to manufacture.

Also, since segments of an identical design are arranged into an annular shape, only one jig and only one metal mold are enough when responding to demand.

DESCRIPTION OF EMBODIMENTS

Hereinafter, embodiments of the present invention will be described based on the attached drawings.

Figure 1:
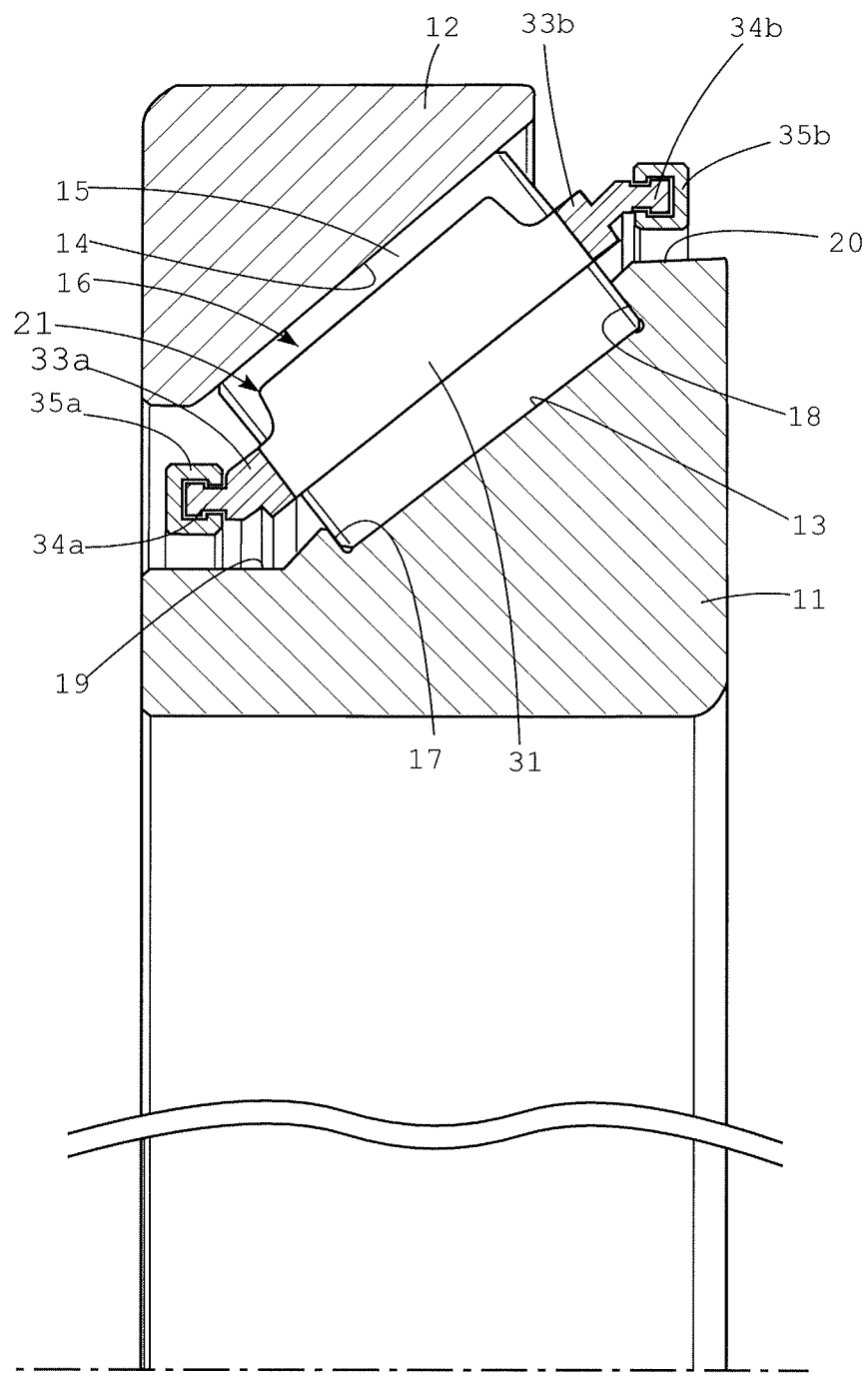
FIG. 1 is a sectional view which shows an application of the present invention to a tapered roller bearing.

FIG. 1 shows part of a large tapered roller bearing which is used in supporting a main shaft in wind power-generation equipment for example. The tapered roller bearing includes an inner ring 11, an outer ring 12 disposed coaxially around an outer circumference thereof, tapered rollers 15 disposed between an inner ring track 13 of the inner ring 11 and an outer ring track 14 of the outer ring 12 opposed thereto, and a retainer 16 which keeps a constant space between the tapered rollers 15.

On an average, the tapered rollers 15 used in a large tapered roller bearing for supporting, e.g., a main shaft in wind power-generation equipment, has a diameter not smaller than 40 mm, and the bearing has an outer diameter not smaller than 1 m.

The inner ring 11 has a small flange region 17 formed on a small-diameter side of the inner ring track 13, and a large flange region 18 formed on a large-diameter side thereof. These flange regions 17, 18 guide rotating movement of the tapered rollers 15. On an axially outer side of the small flange region 17 and of the large flange region 18, a small-diameter region 19 and a large-diameter region 20 are formed respectively.

Figure 2:
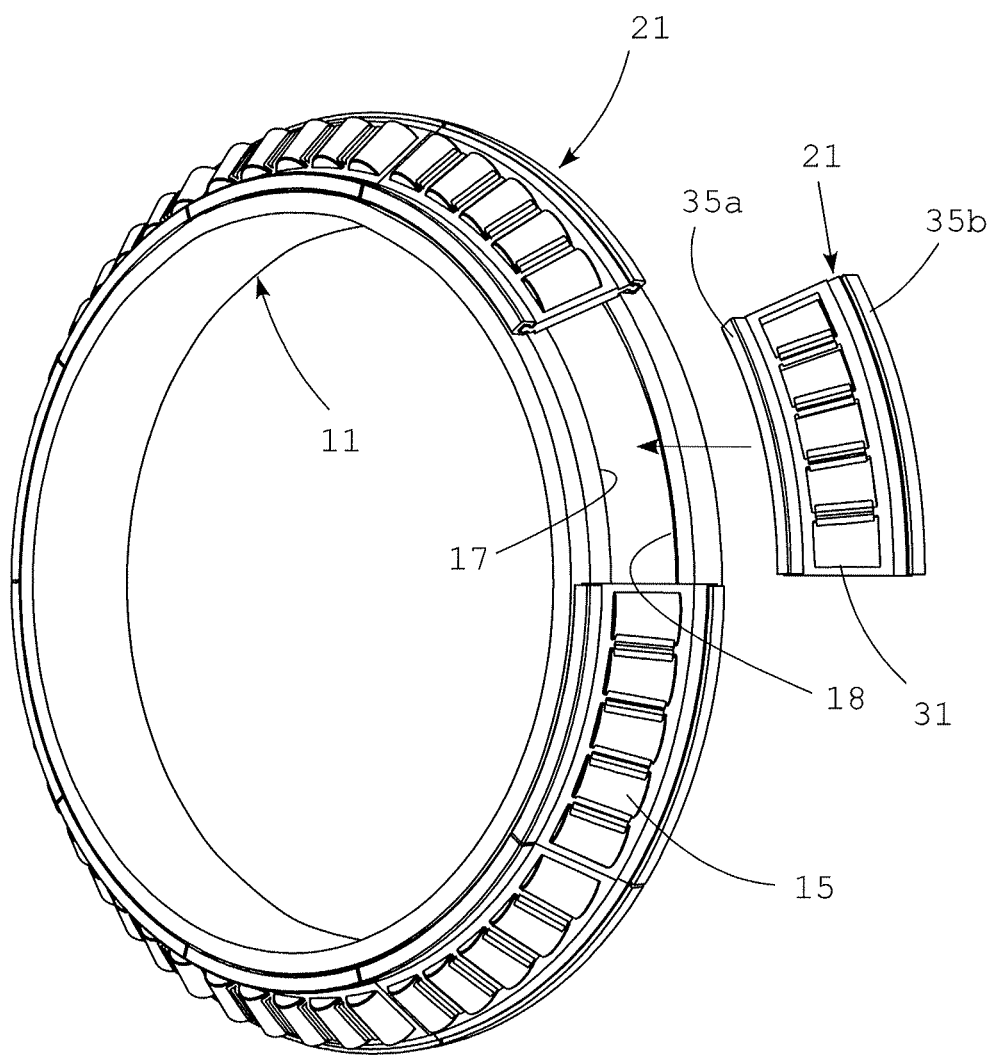
FIG. 2 is a perspective view which shows an assembling procedure of segments of the tapered roller bearing in FIG. 1.
Figure 3:
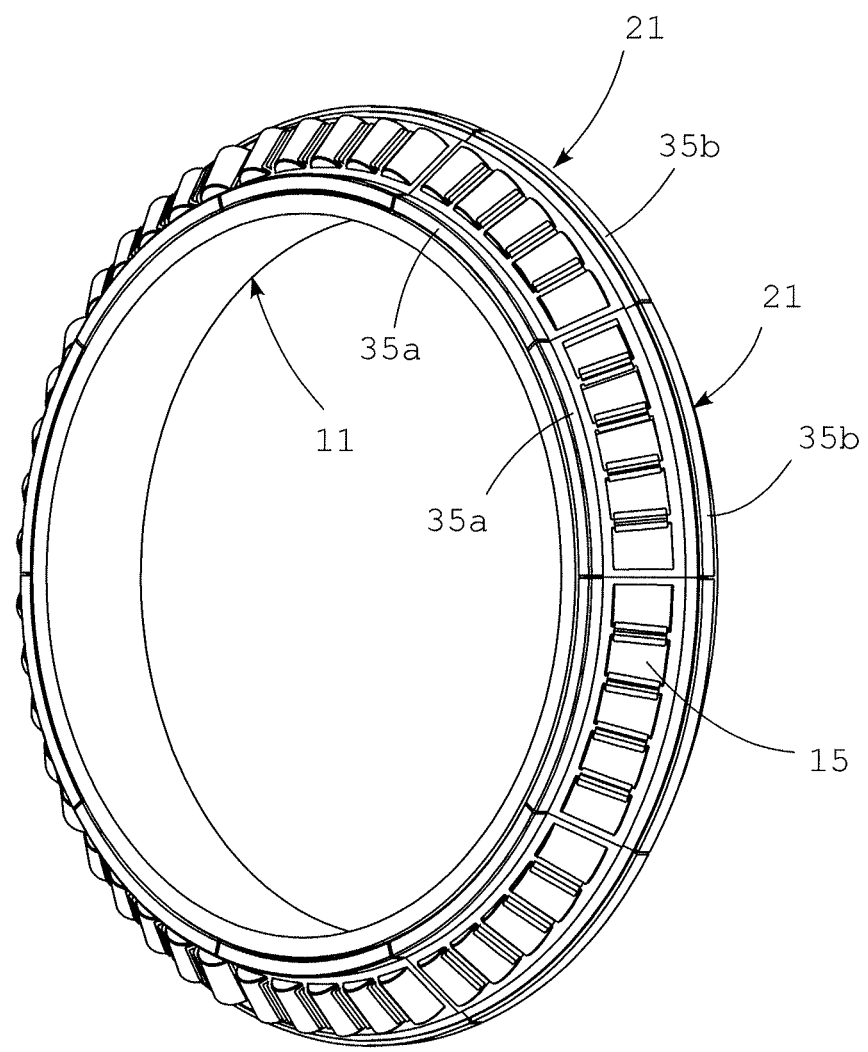
FIG. 3 is a perspective view which shows a state before a connecting member of the segment is slid to establish connection.
Figure 4:
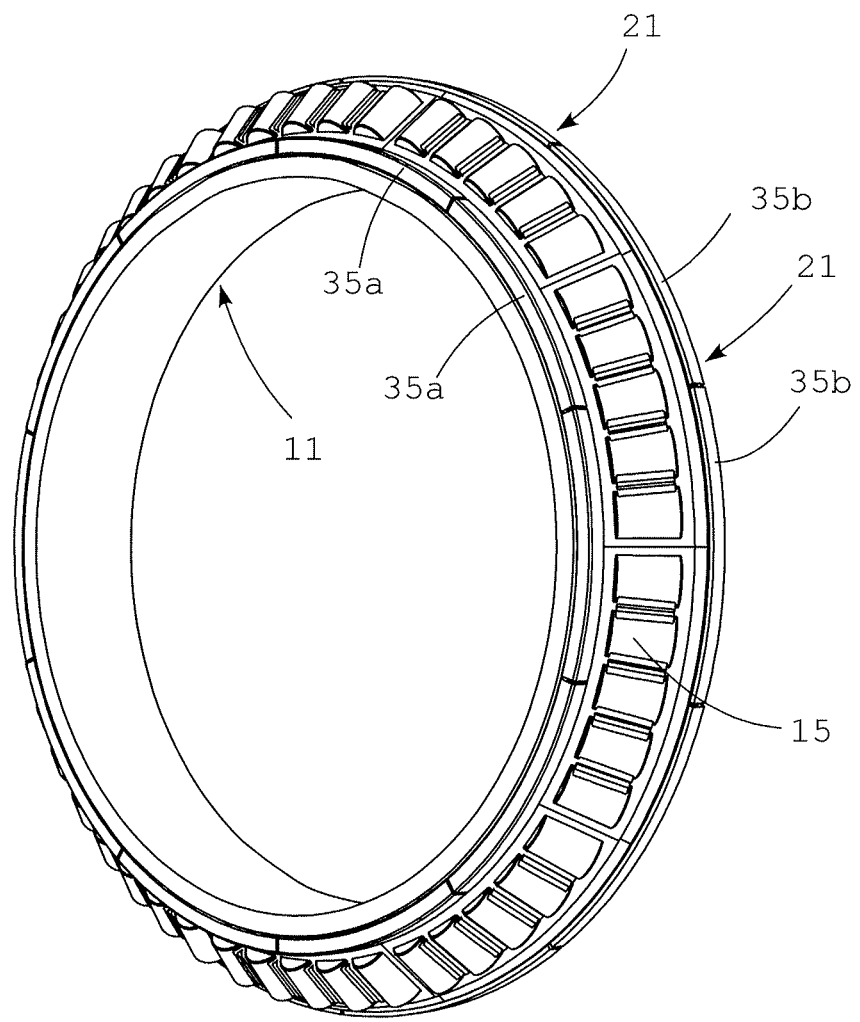
FIG. 4 is a perspective view which shows a state where the connecting member of the segment is slid and connection is established.

As shown in FIG. 2 through FIG. 4, the retainer 16 is constituted by a plurality of circumferentially divided segments 21. By annularly arranging these segments 21, there is fabricated a retainer which looks like a basket having a shape of a truncated cone.

Figure 5:
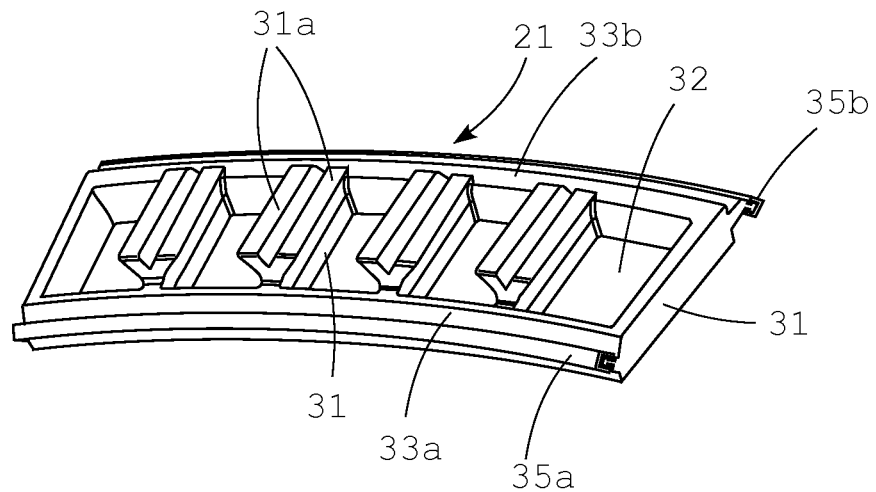
FIG. 5 is a perspective view of a segment with rollers removed.

As shown in FIG. 5, the segment 21 is like a frame, including a plurality (six, in the illustrated embodiment, including two at a left and a right ends) of columns 31 provided between mutually opposing long sides of a rectangle. Pockets 32 (five, in the illustrated embodiment) are formed between the columns 31. Each pocket 32 accepts and holds one tapered roller 15. One of the two long arc-shaped sides of the segment 21 which is faced by a small-diameter end of the tapered roller 15 will be called small-diameter side 33a, whereas the other faced by a large-diameter end will be called large-diameter side 33b.

Figure 6:
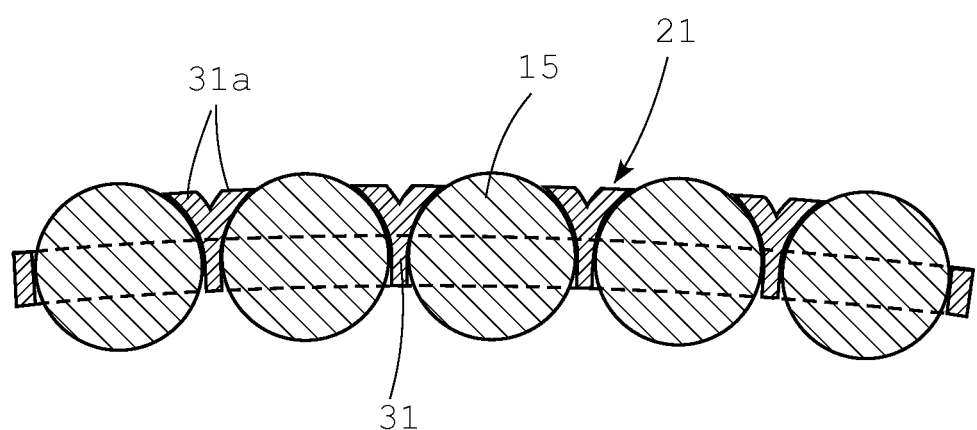
FIG. 6 is a vertical sectional view which shows a state where rollers are held by the segments.

Of the six columns 31, four columns 31 at intermediate locations, excluding the two at the ends, have their top ends formed with a Y-shaped arc portion 31a (see FIG. 5). Each arc portion 31a holds two tapered rollers 15 on its sides (see FIG. 6).

Figure 7:
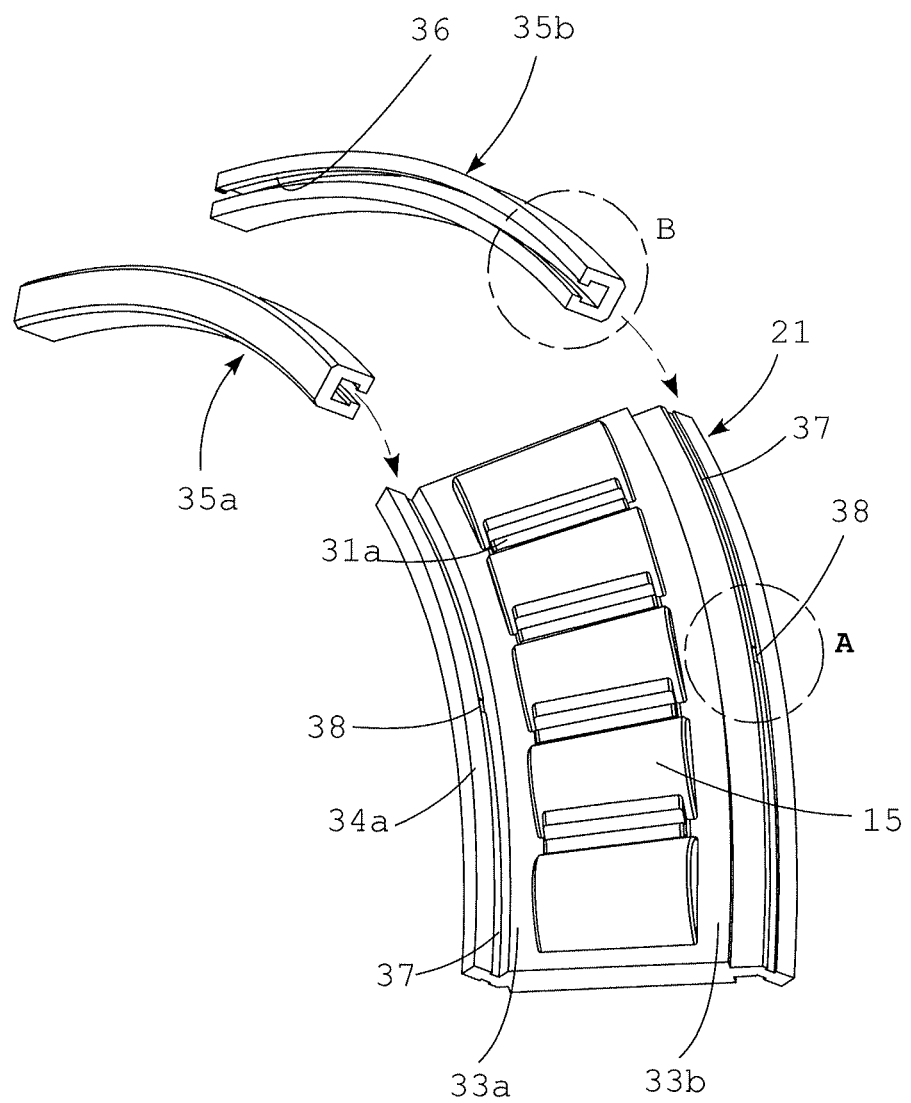
FIG. 7 is a perspective view which shows a state where the connecting member of the segment is removed.
Figure 8:
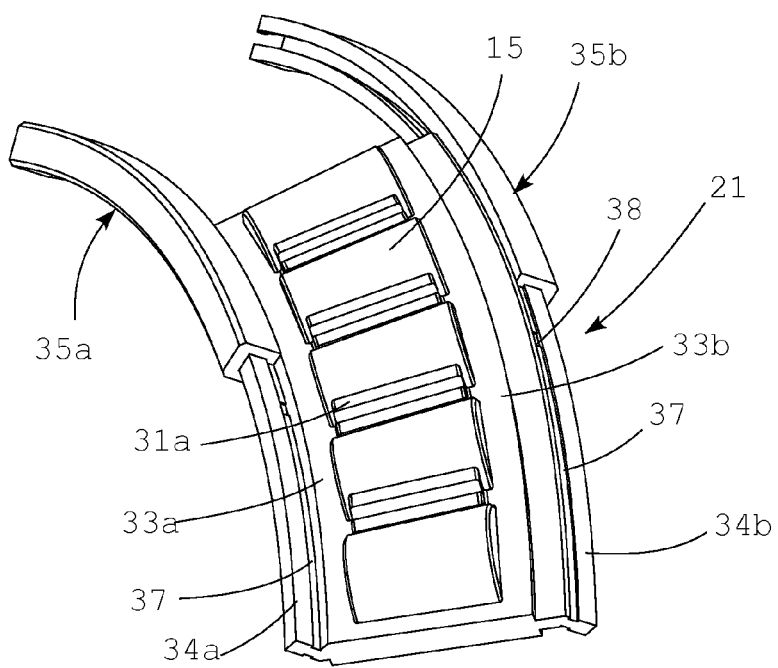
FIG. 8 is a perspective view which shows a state where the connecting member in FIG. 7 is slid from the segment.

The small-diameter side 33a and the large-diameter side 33b of the segments 21 are respectively formed with a small-diameter-side engager 34a and a large-diameter-side engager 34b each protruding axially outward of the segments 21 and having a tip edge curved in parallel with the axis. As shown in FIG. 7 and FIG. 8, the small-diameter-side engager 34a and the large-diameter-side engager 34b are respectively fitted, in a circumferentially slidable fashion, into a small-diameter-side connecting member 35a and a large-diameter-side connecting member 35b which have the same circumferential length as the small-diameter-side engager 34a and the large-diameter-side engager 34b respectively and a generally U-shaped section.

As shown in FIG. 2 and FIG. 3, the segments 21 are arranged in a circumferential direction, and under this state, the small-diameter-side connecting member 35a and the large-diameter-side connecting member 35b of each segment 21 are slid over the small-diameter-side engager 34a and the large-diameter-side engager 34b of the adjacent segment respectively as shown in FIG. 4 and FIG. 8. As a result, the segments 21 arranged in the circumferential direction are connected to each other, and therefore separation of the segments 21 during an assembling process is prevented.

Figure 9:
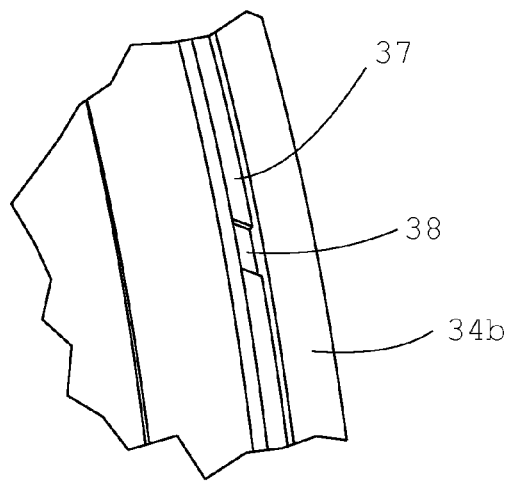
FIG. 9 is an enlarged perspective view of a region in Circle A in FIG. 7.

As shown in FIG. 7 and FIG. 9, the small-diameter-side connecting member 35a and the large-diameter-side connecting member 35b, both having a U-shaped section, have their tip edge regions formed with mutually opposing salients 36. The salients 36 fit into re-entrant grooves 37 formed in both upper and lower surfaces of the small-diameter-side engager 34a and the large-diameter-side engager 34b in the segment 21. The salients 36 and the re-entrant grooves 37 fit to each other, whereby the small-diameter-side connecting member 35a and the large-diameter-side connecting member 35b which have a U-shaped section are made axially non-slippable with respect to the small-diameter-side engager 34a and the large-diameter-side engager 34b of the segment 21.

Figure 10:
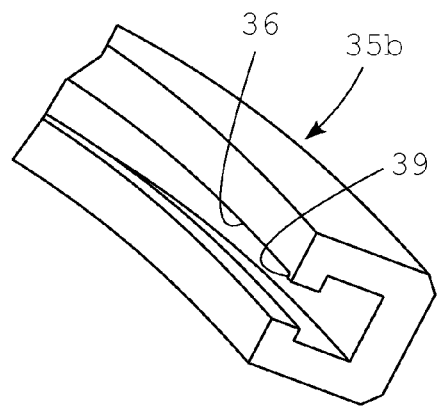
FIG. 10 is an enlarged perspective view of a region in Circle B in FIG. 7.

In addition, at a circumferentially intermediate position in the re-entrant groove 37 in both surfaces in each of the small-diameter-side engager 34a and the large-diameter-side engager 34b, there is formed an engagement recess 38 as shown in Circle A in FIG. 7 and in an enlarged view in FIG. 9. The engagement recess 38 is fitted by an engagement projection 39 which is formed at each end of the salients 36 as shown in Circle B in FIG. 7 and in an enlarged view in FIG. 10. The engagement recess 38 and the engagement projection 39 come into engagement when the small-diameter-side connecting member 35a and the large-diameter-side connecting member 35b are circumferentially slid by half their length as shown in FIG. 4, on the small-diameter-side engager 34a and the large-diameter-side engager 34b of the segments 21. In this way, the small-diameter-side connecting member 35a and the large-diameter-side connecting member 35b of the segments 21 are brought to their predetermined circumferential positions.

The small-diameter-side connecting member 35a and the large-diameter-side connecting member 35b of the segments 21 can be formed by machining or pressing a copper or a ferrous metal (e.g., SPCC and SUS). Once the engagement projection 39 is fitted into the engagement recess 38, both ends of the small-diameter-side connecting member 35a and of the large-diameter-side connecting member 35b in the segments 21 are radially swaged to fix the small-diameter-side connecting member 35a and the large-diameter-side connecting member 35b to their predetermined circumferential positions and to prevent the small-diameter-side connecting member 35a and the large-diameter-side connecting member 35b from sliding.

The segments 21 can be formed of a resin material such as PEEK, PPS, PA (66 or 46).

Forming the engagement projection 39 at both ends of the salient 36 in each of the small-diameter-side connecting member 35a and the large-diameter-side connecting member 35b increases fitting with the re-entrant groove 37 which is formed in the small-diameter side engager 34a and the large-diameter-side engager 34b of the segments 21. By setting the gap between the mutually opposed engagement projections 39 in each of the small-diameter-side connecting member 35a and the large-diameter-side connecting member 35b wider than a thickness between two bottom surfaces of the re-entrant grooves 37 which are formed in the upper and the lower surfaces of the small-diameter-side engager 34a and the larger-diameter-side engager 34b of the segments 21, the small-diameter-side connecting member 35a and the large-diameter-side connecting member 35b can slide more smoothly.

The segments 21 in the embodiment described thus far are first placed in an annular pattern as shown in FIG. 2 and FIG. 3, on an outer circumference of the inner ring 11; and then as shown in FIG. 4, the small-diameter-side connecting member 35a and the large-diameter-side connecting member 35b are slid over the small-diameter-side engager 34a and the large-diameter-side engager 34b of the adjacent segment 21. This ensures that the segments 21 arranged in an annular pattern are assembled to the outer circumference of the inner ring 11 without breaking apart.

The segments 21 which are assembled onto the outer circumference of the inner ring 11 can be easily removed: As shown in FIG. 3, the small-diameter-side connecting member 35a and the large-diameter-side connecting member 35b are moved back so that they do not ride on the small-diameter-side engager 34a and the large-diameter-side engager 34b of the adjacent segment 21. Then, as shown in FIG. 2, it becomes possible to disassemble the segments 21 from the outer circumference of the inner ring 11. This makes it easy to perform inspections.

In the embodiment described so far, the small-diameter side 33a and the large-diameter side 33b of the segments 21 are respectively formed with an arc-shaped small-diameter-side engager 34a and an arc-shaped large-diameter-side engager 34b, and the small-diameter-side engager 34a and the large-diameter-side engager 34b are respectively fitted into a small-diameter-side connecting member 35a and a large-diameter-side connecting member 35b which have a generally U-shaped section, in a circumferentially slidable fashion. However, there may be an arrangement that only one of the arc-shaped small-diameter-side engager 34a and an arc-shaped large-diameter-side engager 34b is formed correspondingly to the small-diameter-side connecting member 35a or the large-diameter-side connecting member 35b, without forming the other.

Figure 11:
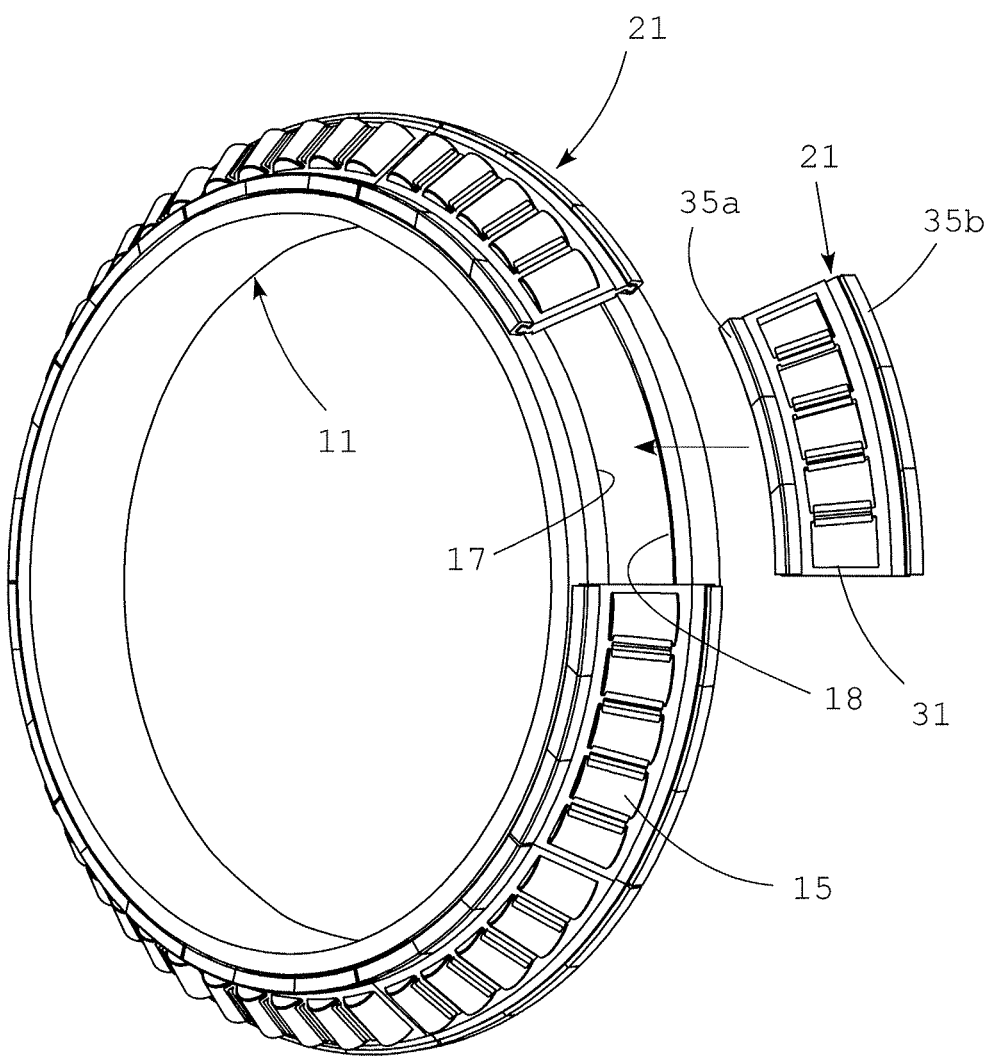
FIG. 11 is a perspective view which shows an assembling procedure of segments of a tapered roller bearing in a second embodiment of the present invention.
Figure 12:
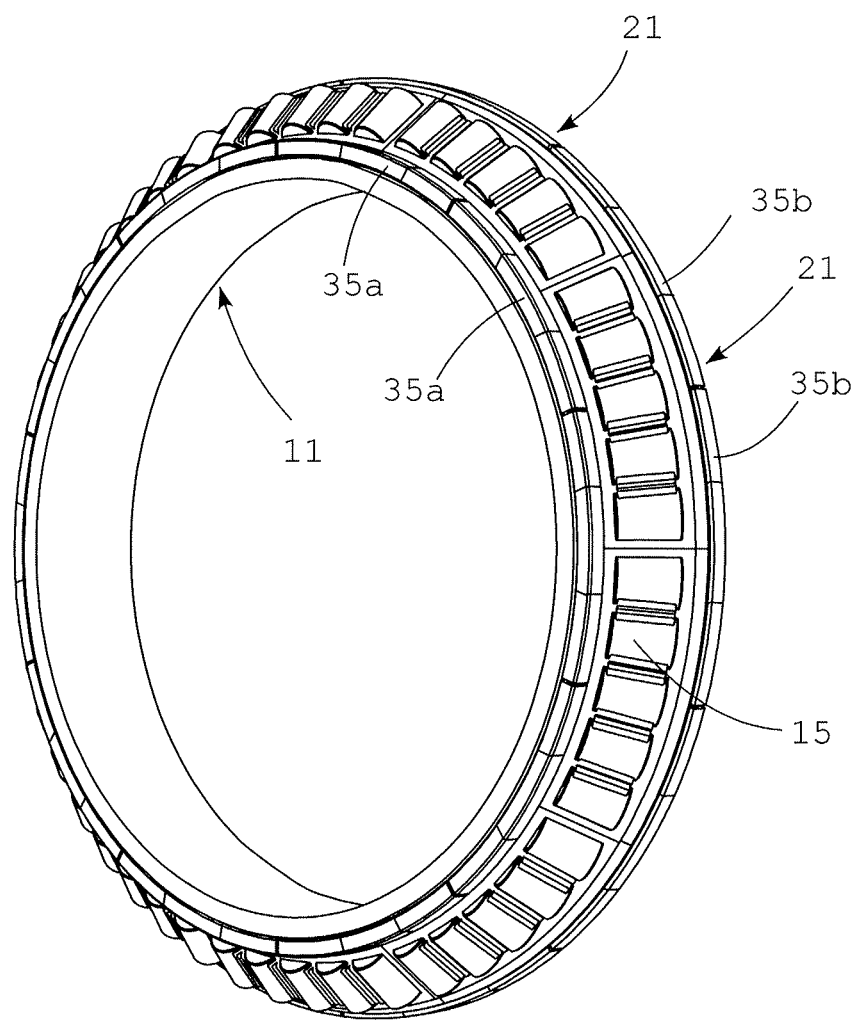
FIG. 12 is a perspective view which shows a state where a connecting member of a segment in the embodiment in FIG. 11 is slid and connection is established.

In the Embodiment described above, the small-diameter-side connecting member 35a and the large-diameter-side connecting member 35b, each having a generally U-shaped section, have the same circumferential lengths as the circumferential lengths of the small-diameter side 33a and the large-diameter side 33b of the segments 21. However, as shown in FIG. 11 and FIG. 12, the small-diameter-side connecting member 35a and the large-diameter-side connecting member 35b, each having a generally U-shaped section, maybe circumferentially divided into a plurality. In the embodiment shown in FIG. 11 and FIG. 12, the small-diameter-side connecting member 35a and the large-diameter-side connecting member 35b, each having a generally U-shaped section, are divided into three.

Although the embodiments described thus far cover applications to tapered roller bearings, the invention is applicable also to retainers for cylindrical roller bearings.

REFERENCE SIGNS LIST

Inner Ring
Outer Ring
13, 14 Track Surfaces
Tapered Roller
Retainer
Small Flange Region
Large Flange Region
Small-Diameter Region
Large-Diameter Region
Segment
Column
31a Arc Portion
Pocket
33a Small-Diameter Side
33b Large-Diameter Side
34a Small-Diameter-Side Engager
34b Large-Diameter-Side Engager
35a Small-Diameter-Side Connecting Member
35b Large-Diameter-Side Connecting Member
Salient
Re-Entrant Groove
Engagement Recess
Engagement Projection

The invention claimed is:

1. A roller bearing retainer comprising two or a greater number of circumferentially disposed segments, each segment including: a plurality of columns between mutually opposing long sides of a rectangle; and a plurality of pockets for holding rollers between the columns; at least one of the mutually opposing long sides of the segment being fitted, in a circumferentially slidable fashion, into an arc-shaped connecting member having a generally U-shaped section; the segments being arranged in the circumferential direction, with the connecting member of each segment slid over the long side of the adjacent segment for mutual connection of the segments.

2. The roller bearing retainer according to claim 1, wherein each arc-shaped connecting member has a circumferential length equal to a circumferential length of the long side of the segment.

3. The roller bearing retainer according to claim 2, wherein each arc-shaped connecting member which has the generally U-shaped section has a tip edge formed with mutually opposing salients whereas the long side of the segment has its upper and lower surfaces each formed with a re-entrant groove for fitting by one of the salients, for prevention of the connecting member from axial separation by mutual engagement between the salients and the re-entrant grooves.

4. The roller bearing retainer according to claim 2, wherein each arc-shaped connecting member which has the generally U-shaped section has an inner surface formed with an engagement projection whereas the long side of the segments is formed with an engagement recess for fitting by the engagement projection of the connecting member upon sliding of the connecting member in each segment over the long side of the adjacent segment, for circumferential positioning of the connecting member by mutual engagement between the engagement projection and the engagement recess at a time of assembling.

5. The roller bearing retainer according to claim 1, wherein each arc-shaped connecting member which has the generally U-shaped section has a tip edge formed with mutually opposing salients whereas the long side of the segment has its upper and lower surfaces each formed with a re-entrant groove for fitting by one of the salients, for prevention of the connecting member from axial separation by mutual engagement between the salients and the re-entrant grooves.

6. The roller bearing retainer according to claim 5, wherein each arc-shaped connecting member which has the generally U-shaped section has an inner surface formed with an engagement projection whereas the long side of the segments is formed with an engagement recess for fitting by the engagement projection of the connecting member upon sliding of the connecting member in each segment over the long side of the adjacent segment, for circumferential positioning of the connecting member by mutual engagement between the engagement projection and the engagement recess at a time of assembling.

7. The roller bearing retainer according to claim 1, wherein each arc-shaped connecting member which has the generally U-shaped section has an inner surface formed with an engagement projection whereas the long side of the segments is formed with an engagement recess for fitting by the engagement projection of the connecting member upon sliding of the connecting member in each segment over the long side of the adjacent segment, for circumferential positioning of the connecting member by mutual engagement between the engagement projection and the engagement recess at a time of assembling.

8. The roller bearing retainer according to claim 7, wherein each arc-shaped connecting member which has the generally U-shaped section is formed by machining or pressing a copper or a ferrous metal, the connecting member being swaged, with the engagement projection of the connecting member fitted into the engagement recess of the segment, for prevention of the connecting member from sliding in a circumferential direction.

\* \* \* \* \*